Dec. 11, 1928.
D. G. MILLIGAN
1,695,053
PORTABLE LIQUID RECORDING FUNNEL
Filed June 11, 1926
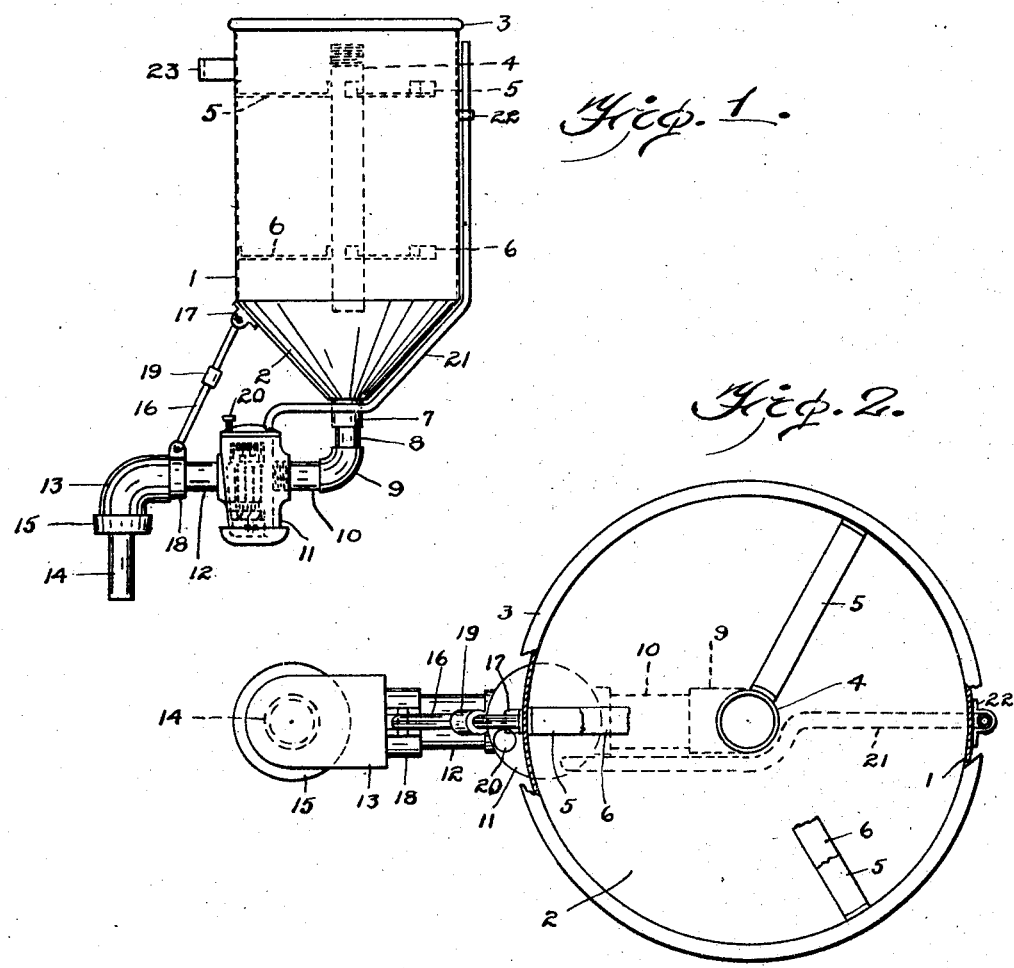
INVENTOR.
D. G. Milligan
BY
Elwin M. Hulse
ATTORNEY.

Patented Dec. 11, 1928.

1,695,053

UNITED STATES PATENT OFFICE.

DANIEL G. MILLIGAN, OF FORT WAYNE, INDIANA.

PORTABLE LIQUID-RECORDING FUNNEL.

Application filed June 11, 1926. Serial No. 115,284.

The invention relates to funnels by which liquids are conducted into containers and by which the quantity of liquid that passes through it is recorded.

At the present time liquid fuels and oils are used in large quantities and their proper dispensation is an important matter to the customer in order that an unscrupulous dealer may not defraud him. Where liquid fuels are dispensed to customers in relatively large quantities the custom is to make delivery in the so-called tank wagon, from which the liquid is continuously discharged into the customer's storage tank or receptacle, or from which the liquid is withdrawn into measuring cans and poured into the storage tank. Where the liquid flows out of the tank wagon into the storage tank the amount of liquid dispensed is generally determined by a measuring stick that is inserted into the tank on the wagon and the difference in the level of the liquid therein before and after the discharge indicates the quantity dispensed. When measuring cans are used they must be accurately filled and the number thereof accurately noted to ensure accuracy in the delivery. To avoid fraud or deception the customer must be present and note carefully the delivery.

The object of my invention is to provide simple means by which a customer may be informed of the actual quantity of liquid he has received.

Another object is to provide a simple metering funnel which is portable and readily applied to a receptacle and which is adapted for the pouring of liquid therein and for the connection of a discharge hose or conduit thereto, and by which all the quantity of liquid flowing through it will be recorded.

An embodiment of the invention is illustrated in the accompanying drawings in which—

Figure 1 is a side elevational view of a device embodying the invention and Fig. 2 a plan view of the same.

Referring to the drawings, 1 represents a cylinder formed preferably of sheet metal, and having a conical bottom 2. The upper edge 3 is rolled over to form a flange for strengthening the cylinder. The cylinder and its conical bottom thus form a funnel. A pipe 4 is centrally supported within the funnel by the brackets 5 and 6, the upper end of the pipe being exteriorly threaded to receive the coupling of a hose or conduit that leads, say, from a tank wagon, where such hose is used. The lower end of the pipe is preferably spaced from the apex of the conical bottom. A sleeve 7 is suitably connected to the conical bottom in an opening provided in the apex thereof. A nipple 8 is connected to the sleeve and to an elbow 9. A nipple 10 is connected to the elbow 9 and to one side of a suitable recording flow meter mechanism 11. A pipe 12 is connected to the opposite side of the mechanism 11 and to an elbow 13, to which elbow a discharge pipe 14 is connected. A pad 15, preferably formed of rubber, is mounted on the pipe 14 and abuts the elbow 13.

A member or rod 16 is pinned to a bracket 17 secured to the funnel and it is also pinned to a collar 18 mounted on the pipe 12 or the elbow 13, a hand grip 19 being mounted on the member 16. The member 16 not only braces the parts but forms a convenient handle in connection with a handle 23 secured to the funnel by which to carry or support the entire device.

An adjusting screw 20 is suitably mounted on the meter by which to adjust the same.

A vent pipe 21 communicates with the meter mechanism and is extended upwardly at the side of the funnel and held thereto by a bracket 22 formed on the funnel.

In use the device may be carried to the receptacle to be filled or to the fill pipe that leads to the receptacle and the pipe 14 is inserted into the receptacle or fill pipe. The reading of the meter is noted and the liquid is deposited into the funnel either by pouring the same into the funnel from cans or by inserting the end of the discharge hose into the funnel or connecting it to the pipe 4. All liquid that enters the funnel flows through the meter and out through the pipe 14, thereby operating the meter and causing it to record the quantity of liquid that flows through the device.

The device is readily handled and carried about and the purchaser is enabled thereby to determine the exact amount of liquid he has received.

What I claim is:

A portable liquid measuring device comprising a container having a conical bottom, a handle secured to the container, a conduit mounted within the container and having screw threads at one end, a discharge conduit supported in the conical bottom and adapted to convey liquid supplied to the container through the first named conduit, a combined brace and handle connected to the container and to the discharge conduit, and recording mechanism interposed in the discharge conduit and operated by the liquid flowing through said conduit to record the quantity of said liquid.

In witness whereof I have hereunto set my hand this 2nd day of June, 1926.

DANIEL G. MILLIGAN.